(12) United States Patent
Marciano et al.

(10) Patent No.: US 7,458,630 B1
(45) Date of Patent: Dec. 2, 2008

(54) TEMPORARY VEHICLE COVER

(76) Inventors: Steven Marciano, 415 SE. 11th Ct., Apt. 5, Ft. Lauderdale, FL (US) 33316; Trevor Ricker, 2420 SE. 11th St., Unit C-405, Ft. Lauderdale, FL (US) 33316; James Purcell, 957 Lakeview Dr., N. Fort Myers, FL (US) 33903

( * ) Notice: Subject to any disclaimer, the term of this patent is extended or adjusted under 35 U.S.C. 154(b) by 0 days.

(21) Appl. No.: 11/635,984

(22) Filed: Dec. 8, 2006

Related U.S. Application Data

(60) Provisional application No. 60/752,551, filed on Dec. 21, 2005.

(51) Int. Cl.
*B60J 9/00* (2006.01)

(52) U.S. Cl. .............................. 296/136.01; 296/136.07; 296/136.1; 150/166

(58) Field of Classification Search ............ 296/136.01, 296/136.07, 136.1; 150/166, 167
See application file for complete search history.

(56) References Cited

U.S. PATENT DOCUMENTS

| | | | | |
|---|---|---|---|---|
| 3,032,433 A | * | 5/1962 | Lewis et al. ................. | 156/247 |
| 5,012,760 A | * | 5/1991 | George, Jr. .................. | 118/505 |
| 6,056,347 A | * | 5/2000 | D'Adamo .............. | 296/136.02 |
| 2005/0151391 A1 | * | 7/2005 | Bryd ........................ | 296/136.1 |
| 2005/0179283 A1 | * | 8/2005 | Lin ........................ | 296/136.01 |

\* cited by examiner

*Primary Examiner*—Lori L Lyjak
(74) *Attorney, Agent, or Firm*—H. John Rizvi; Glenn E. Gold; Gold & Rizvi, P.A.

(57) ABSTRACT

A temporary vehicle cover includes a transparent cover and means for securing the transparent cover to the motor vehicle. The transparent is shaped to fit over a motor vehicle. The transparent cover includes a transparent cover top surface, a transparent cover bottom surface, a transparent cover first side, a transparent cover second side, a transparent cover rear end and a transparent cover securing end. Lengthwise perforations formed down substantially a middle of the transparent cover and separate the transparent cover first side from the transparent cover second side. The transparent cover first side is separated from the transparent cover second side to remove the temporary vehicle cover from a motor vehicle. A drawstring sewn into a hem of a perimeter of the temporary vehicle cover or an elastic loop may be used for the means for securing the transparent cover to the motor vehicle.

13 Claims, 2 Drawing Sheets

TEMPORARY VEHICLE COVER

CROSS-REFERENCE TO RELATED APPLICATION

This application claims the benefit of co-pending United Stated Provisional Patent Application Ser. No. 60/752,551, filed on Dec. 21, 2005, which is incorporated herein in its entirety.

BACKGROUND OF THE INVENTION

1. Field of the Invention

The present invention relates generally to a vehicle cover, and more particularly to a temporary vehicle cover for motor vehicle dealerships, that protects vehicles from adverse environmental conditions, such as rain, snow and sleet, as well as pollutants, aids in identification of protected vehicles, and preserves the aesthetically pleasing new vehicle appearance in a cost-efficient manner.

2. Description of the Prior Art

The benefits associated with vehicle covers are well known. In this regard, the use of vehicle covers for automobile protection has existed for many years. Traditionally, vehicle covers utilize heavy weatherproof fabric, such as UV resistant polyester fibers to protect against the sun's harmful rays, repel water, block dust, tree sap, bird droppings, and breath to allow moisture and heat to escape from under the cover. These types of covers offer benefits for those who live in intense sun climates and along coastal areas and are looking for long term storage, as well as those in colder, northern climates, who must deal with inclement weather conditions for long stretches of time.

As beneficial as vehicle covers are in protecting against the elements, they are not without drawbacks to vehicle dealerships. The primary function of motor vehicle dealerships is to entice the consumer with their selection of visually appealing and immaculate vehicles that are available for purchase. The motor vehicle dealerships are forced to spend significantly funds to maintain the aesthetic beauty of their stock by washing the vehicles thoroughly on a regular basis, until they are sold and moved off the lot. Though some dealers might choose to garage all their vehicles, most cannot afford this luxury, and must rely on expensive vehicle covers. Most vehicle covers are designed for long term use, and are not very practical for dealerships, where motor vehicles are not kept for extended periods of time.

Another problem with utilizing existing covers is that they are constructed of heavy, weatherproof fabric and not transparent. This fabric makes quick identification of covered vehicles extremely difficult, time consuming, and cumbersome to the dealership, which strives to make fast sales and not give the customer a chance to change their minds or look elsewhere.

Accordingly, there is an established need for a cost-efficient temporary vehicle cover that addresses the specific concerns of motor vehicle dealerships by providing a short term cover for protecting vehicles against adverse environmental conditions, as well as making the vehicles easily identifiable in a fast paced business environment.

SUMMARY OF THE INVENTION

The present invention is directed to a temporary vehicle cover. The temporary vehicle cover of the present invention is configured for assisting dealerships in dealing with the problem of automobile maintenance by providing protection against the elements, without incurring the expense of garaging vehicles, or costly long term vehicle covers that make it difficult to identify the vehicle they are placed on.

An object of the present invention is to provide a temporary vehicle cover that is easy to place on a vehicle.

A further object of the present invention is to provide a temporary vehicle cover that is easy to remove from a vehicle.

Another object of the present invention is to provide a temporary vehicle cover that is transparent, so as to assist with quick identification of the vehicle which it is protecting.

A further object of the present invention is to provide a temporary vehicle cover that is cost-efficient to produce.

Yet another object of the present invention is to provide a temporary vehicle cover that is disposable and can be recycled, instead of taking up storage space.

In accordance with a first aspect of the invention, a temporary vehicle cover is provided comprising a piece of material that fits over the vehicle and protects it against environmental pollutants and inclement weather conditions.

In accordance with a second aspect of the invention, lengthwise perforations are provided on the cover to ease detachability.

In accordance with a third aspect of the invention, the cover is made of a transparent material to maximize visual identification in a dealership environment.

In accordance with a fourth aspect of the invention, drawstrings are provided for securing the temporary cover to the vehicle.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Shown throughout the figures, the present invention is generally directed towards a temporary vehicle cover, designed specifically for motor vehicle dealerships to help protect their stock from the elements and pollutants, easily identify protected vehicles, and cut costs for long term garaging and utilizing expensive permanent vehicle covers.

Figure 1:
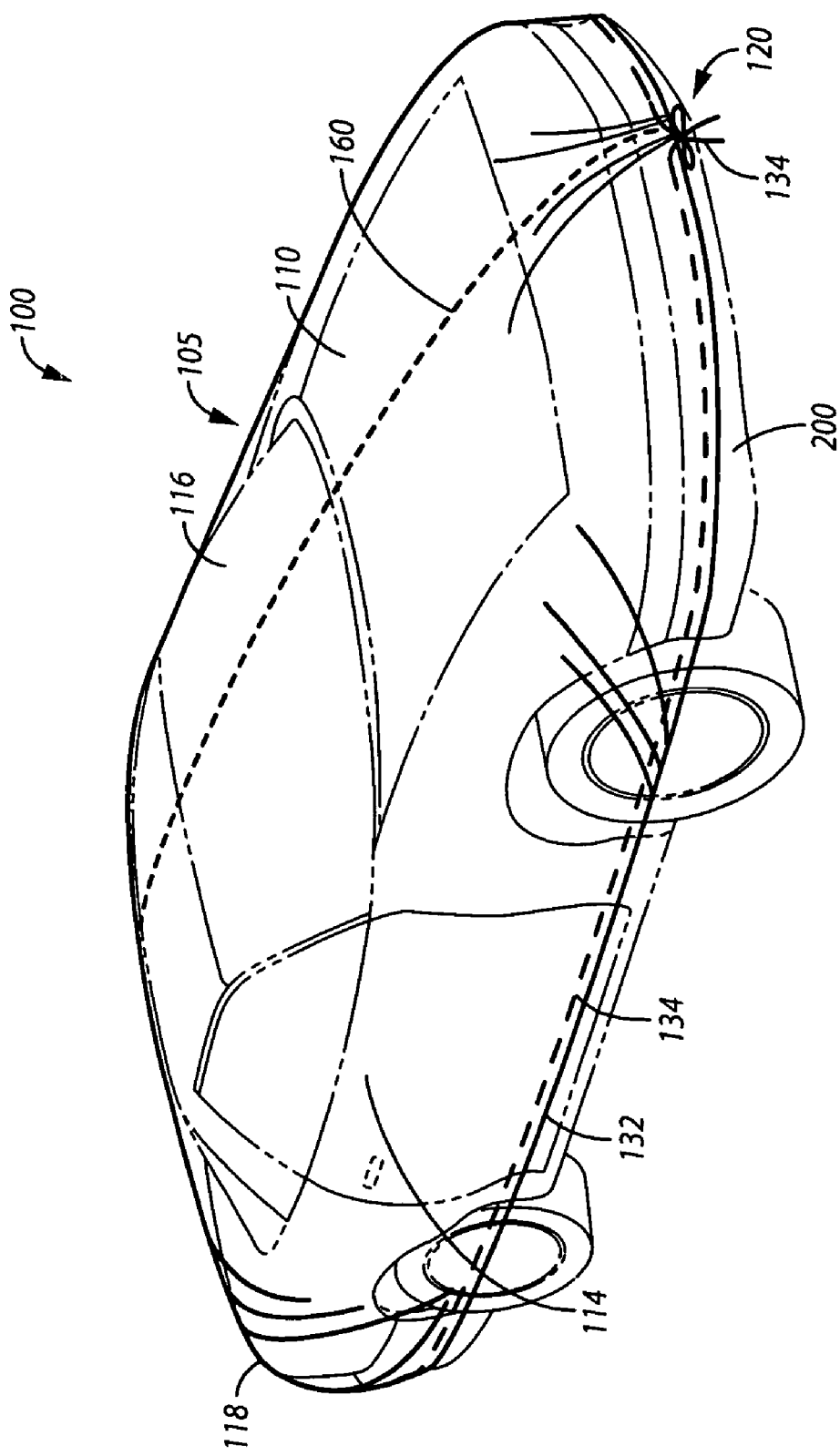
FIG. 1 is a perspective view of the temporary vehicle cover, shown with the cover in place over a vehicle and secured by the drawstrings.

Referring now to FIG. 1, the preferred embodiment of the temporary vehicle cover 100 is shown placed over a motor vehicle 200 for protection. The temporary vehicle cover 100 includes a transparent cover 105 and means for securing the transparent cover 105 to the motor vehicle 200. The transparent cover 105 is shaped to fit over a motor vehicle 200. The transparent cover 105 includes a transparent cover top surface 110, a transparent cover bottom surface 112, a transparent cover first side 114, a transparent cover second side 116, a transparent cover rear end 118, and a transparent cover securing end 120. It will be appreciated by those skilled in the art that the temporary vehicle cover 100 may be formed out of a thin plastic recyclable material that will not leave any abrasions on the protected vehicle. The temporary vehicle cover 100 is disposable, thus eliminating the need for storage when not in use. The temporary vehicle cover can also be formed out of any of a wide variety of other similar materials without departing from the present invention.

Also shown in FIG. 1 is the cover securing means. In the preferred embodiment, a drawstring 134 will be retained in a transparent cover hem 132, which extends around a perimeter of the temporary vehicle cover 100. Each end of the drawstring 134 extends outside the transparent cover securing end 120, where it can be tightened and tied, thus securing the temporary vehicle cover 100 in place. It should be noted that, in the alternative, the temporary vehicle cover 100 may include an elastic loop retained around the perimeter instead of a drawstring (similar to a shower cap), which can be slipped on the motor vehicle 200. The temporary vehicle cover 100 would be held in place by a length of a perimeter being decreased due to the hoop strength of the elastic loop.

Figure 2:
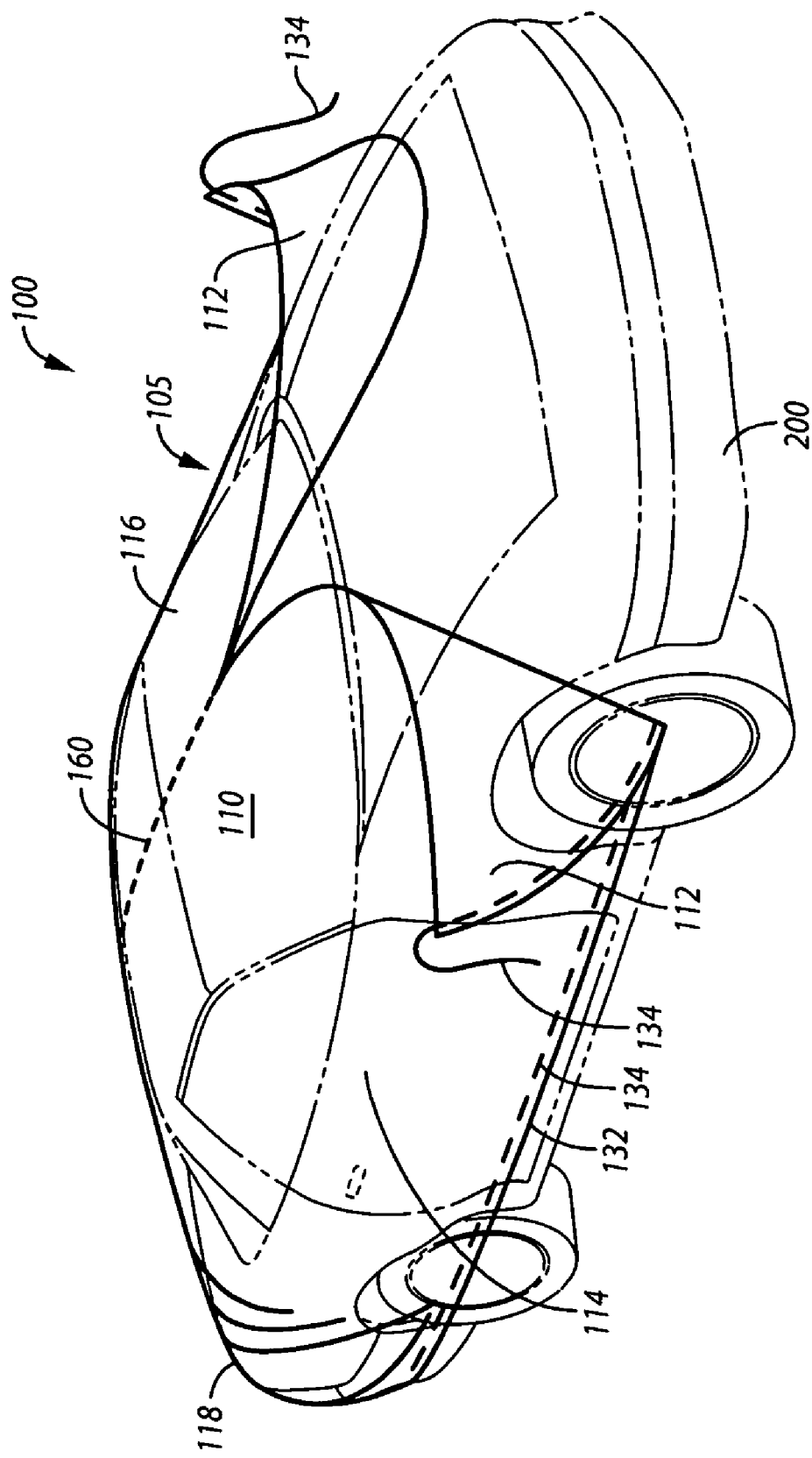
FIG. 2 is a perspective view of the temporary vehicle cover, shown being detached from the vehicle by separating the perforated cover.

Referring now to FIG. 2, the temporary vehicle cover 100 is shown in a state of partial removal. The efficient manner of removal is accomplished by separating the transparent cover first side 114 from the transparent cover second side 116 at the lengthwise perforations 160, located in the middle of the transparent cover top surface 110. The transparent cover first side 114 and the transparent cover second side 116 are separated at the lengthwise perforations 160 to expose the transparent cover bottom surface 112. Once the temporary vehicle cover 100 has been detached, it can be disposed of and/or recycled. However, if the elastic loop is used, the elastic loop must be cut at the transparent cover securing end 120, adjacent the lengthwise perforations 160, before removal of the temporary vehicle cover 100.

Since many modifications, variations, and changes in detail can be made to the described preferred embodiments of the invention, it is intended that all matters in the foregoing description and shown in the accompanying drawings be interpreted as illustrative and not in a limiting sense.

We claim:

1. A vehicle cover comprising:
a sheet of material being shaped to fit over a motor vehicle;
means for decreasing a length of a perimeter of said sheet of material to retain said sheet of material on the motor vehicle; and
lengthwise perforations being formed down substantially a middle of said sheet of material, wherein said sheet of material being separated at said lengthwise perforations to remove said sheet material from the motor vehicle.

2. The vehicle cover of claim 1 wherein:
said sheet of material being transparent.

3. The vehicle cover of claim 1 wherein:
said means for decreasing a length of a perimeter of said sheet of material being a draw string.

4. The vehicle cover of claim 1 wherein:
said means for decreasing a length of a perimeter of said sheet of material being an elastic loop.

5. The vehicle cover of claim 1 wherein:
said sheet of material not marring a finish of the motor vehicle.

6. A vehicle cover comprising:
a transparent sheet of material being shaped to fit over a motor vehicle; and
means for decreasing a length of a perimeter of said sheet of material to retain said sheet of material on the motor vehicle; and
lengthwise perforations being formed down substantially a middle of said transparent sheet of material, said sheet of material being separated at said lengthwise perforations to remove said sheet material from the motor vehicle.

7. The vehicle cover of claim 6 wherein:
said means for decreasing a length of a perimeter of said transparent sheet of material being a draw string.

8. The vehicle cover of claim 6 wherein:
said means for decreasing a length of a perimeter of said transparent sheet of material being an elastic loop.

9. The vehicle cover of claim 6 wherein:
said transparent sheet of material not marring a finish of the motor vehicle.

10. A vehicle cover comprising:
a transparent sheet of material being shaped to fit over a motor vehicle;
means for decreasing a length of a perimeter of said sheet of material to retain said sheet of material on the motor vehicle; and
lengthwise perforations being formed down substantially a middle of said sheet of material, wherein said sheet of material being separated at said lengthwise perforations to remove said sheet material from the motor vehicle.

11. The vehicle cover of claim 10 wherein:
said means for decreasing a length of a perimeter of said transparent sheet of material being a draw string.

12. The vehicle cover of claim 10 wherein:
said means for decreasing a length of a perimeter of said transparent sheet of material being an elastic loop.

13. The vehicle cover of claim 10 wherein:
said transparent sheet of material not marring a finish of the motor vehicle.

\* \* \* \* \*